Oct. 30, 1962 T. W. CROCKETT ET AL 3,061,798
POSITIVE-STARTING OSCILLATOR CIRCUIT
Filed Jan. 19, 1960
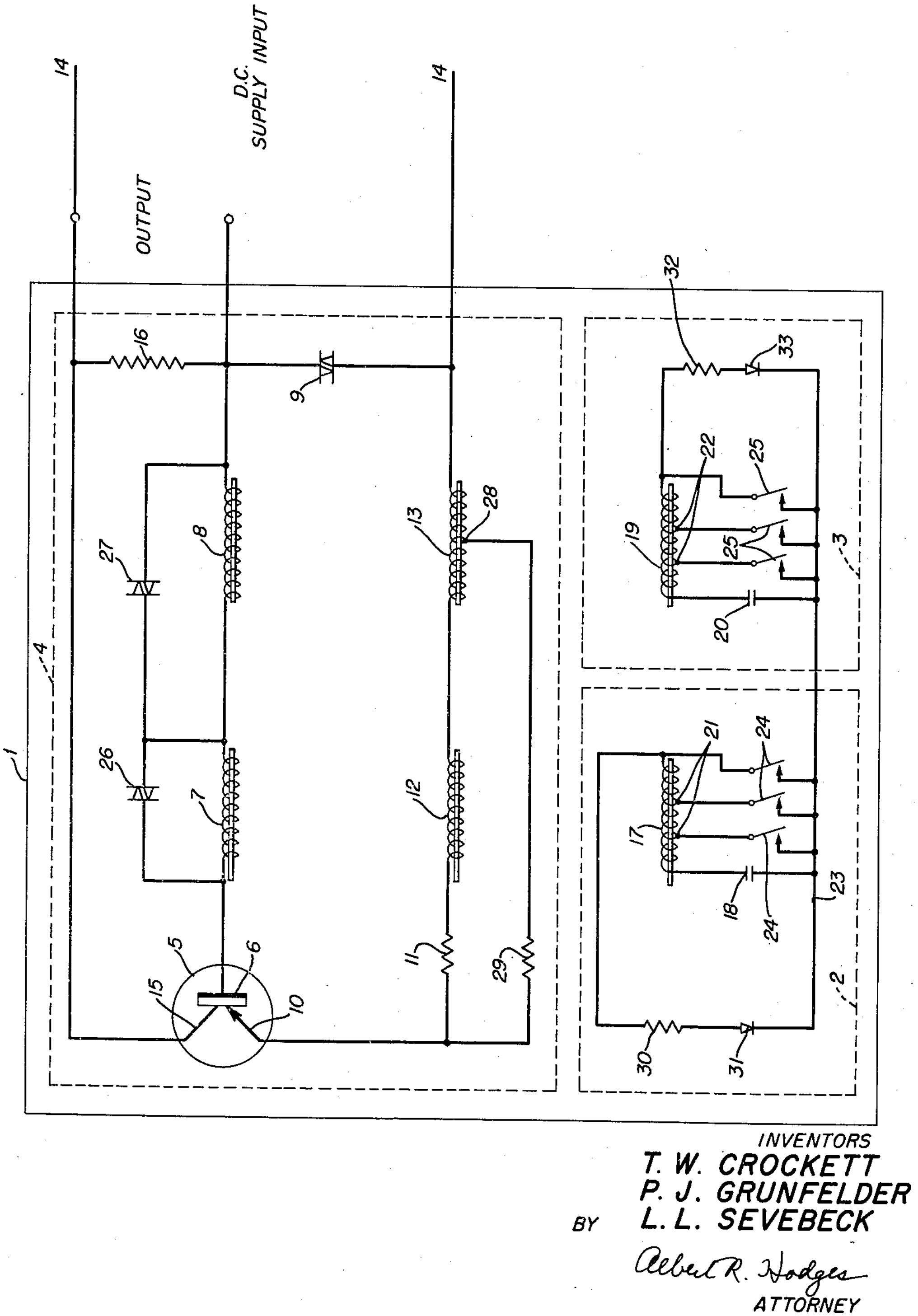
INVENTORS
T. W. CROCKETT
P. J. GRUNFELDER
BY L. L. SEVEBECK
Albert R. Hodges
ATTORNEY United States Patent Office 3,061,798

Patented Oct. 30, 1962

3,061,798

POSITIVE-STARTING OSCILLATOR CIRCUIT

Thomas W. Crockett, Saddle River, and Philip J. Grunfelder and Laurin L. Severbeck, Mountainside, N.J., assignors to Western Electric Company, Incorporated, New York, N.Y., a corporation of New York Filed Jan. 19, 1960, Ser. No. 3,381
4 Claims. (Cl. 331—117)

This invention relates to fast, positive-starting electrical resonant circuits and, more particularly, to such circuits used to supply oscillatory discharge energy for practically instantaneous control of oscillation generators.

Various electrical circuits utilize for control purposes resonant circuit means that provide discharge energy upon activation. Such a circuit, for example, is the oscillation generator disclosed in the copending application of the coinventors L. A. Meacham and F. West, Serial No. 759,474, filed September 8, 1958 and assigned to Bell Telephone Laboratories, Incorporated. This type of oscillation generator may be utilized in systems for transmitting data in the form of coded alternating-current multi-frequency signals over telephone networks. Such a transmission system utilizing an oscillation generator of this type is disclosed in the copending application of the coinventors M. D. DiIorio, P. J. Grunfelder and L. L. Sevebeck, Serial No. 784,983, filed January 5, 1959 and assigned to Western Electric Company, Incorporated. Transmitting data by such a system involves generating a plurality of alternating-current voltages of different frequencies, combining selected ones of these voltages so as to provide for each data character a coded multi-frequency signal, transmitting such coded signals over the telephone network in spaced time relationship, and effecting a determination of the component alternating-current voltages of the coded multi-frequency signals sent over the network to provide a reading of each data character.

In order to employ such coded alternating-current multi-frequency signals in such a transmission system, it is essential that the oscillation generator utilized be stable in each of the several signal frequencies. Additionally, since the coded signals preferably appear in the form of a pair of frequencies received simultaneously, it is highly desirable that the two frequency components substantially instantaneously achieve a predetermined voltage relationship which, in most cases, will be one of equality. Further, in order to facilitate detection of the signal components, it is desirable that they have substantially rectangular envelopes. Satisfaction of these signal criteria enhances the accuracy of detection of such coded signals.

The oscillation generator may comprise, for example, a pair of resonant circuit means each of which is electromagnetically coupled to a positive feedback path of an amplifier having a transistor as its active element. This coupling causes the generator to simultaneously oscillate at two frequencies upon the oscillatory energy discharge of the resonant circuit means, thereby producing a multi-frequency signal across the output terminals of the generator. Each of the resonant circuit means of such a generator may comprise a plurality of normally open resonant circuit paths, each of which assumes a different resonant operating frequency upon closure. Because of the energy provided by the oscillation generator to the resonant circuit means, selective closure of one of these paths of each of the two resonant circuit means will shock excite the resonant circuit means so as to provide oscillatory discharge energy to the generator feedback path.

Although this type of previously known oscillation generator has generally operated satisfactorily, it has been found that such resonant circuit means often tend to be relatively slow in starting and, under certain occasionally encountered conditions may even fail completely to start.

It is a general object of this invention, therefore, to provide an improved resonant circuit means having increased reliability and having the capability of oscillating at its resonant amplitude at practically the instant it is activated.

A more specific object of this invention is to provide an improved oscillation generator having improved resonant circuit means which are capable of generating signal frequencies of full amplitude practically instantaneously upon selective switching of such resonant circuit means.

In accordance with the present invention, these objects are accomplished by providing an arrangement for initially introducing a direct-current bias across the capacitive element of a normally open resonant circuit means, thus placing a charge thereon. Upon subsequent closure of the resonant circuit means, the discharge of the energy stored in the capacitive element practically instantaneously shock excites the resonant means into oscillation at its resonant frequency and amplitude.

In accordance with the invention, the direct-current bias is preferably provided by a unidirectionally conductive path connected across the serially connected capacitive and inductive elements of a normally open resonant circuit means. The resonant cricuit means is located within an oscillating electromagnetic field as generated, for example, about an oscillation generator, and the inherent capacitances of the resonant circuit means cause spurious currents to be present within its component elements. Because these spurious currents pass in only one direction through the unidirectionally conductive path connected to the capacitive element, a charge is placed upon the capacitive element.

In a preferred embodiment of the invention, the above-described oscillation generator having two normally open resonant circuit means is provided with two unidirectionally conductive paths connected respectively across each of its serially connected capacitive and inductive elements. These unidirectionally conductive paths introduce a charge on each of the capacitive elements during the interval that the resonant circuit means are in their normally open condition. Upon the closure of one of a plurality of the normally open resonant circuit paths of each of the resonant circuit means, the charge so stored is discharged so as to shock excite the resonant circuit means into practically instantaneous oscillation at resonant amplitude and frequency as determined by the closed path.

The invention may be more readily understood by reference to the following detailed description and drawing, the single FIGURE of which comprises a schematic circuit diagram of a preferred embodiment of the instant invention.

Referring to the drawing, there is illustrated an oscillation generator 1 having a pair of resonant circuit means 2 and 3 each of which is electromagnetically coupled to a transistor oscillator 4 having a transistor 5 as its active element. Transistor 5 has its base electrode 6 connected through a pair of series inductors 7 and 8 to one side of a paired diode 9. Device 9 may preferably comprise a pair of oppositely poled parallel-connected varsitors each of which exhibits high resistance up to a peak amplitude and rapidly falling resistance thereabove. The emitter electrode 10 of transistor 5 is connected through an emitter resistor 11 and a pair of series inductors 12 and 13 to the other side of diode 9 and to one of the two power leads 14. The collector electrode 15 of transistor 5 is connected to the other of the power leads 14. A load resistor 16 for abstracting output signals is connected between collector electrode 15 and the side of diode 9 to which series inductor 8 is connected. The conductive path comprising inductors 7 and 8, diode 9, inductors 13 and 12, and emitter resistor 11 comprises a positive feedback path between emitter electrode 10 and base electrode 6 for sustaining oscillations in transistor oscillator 4.

A tap 28 on series inductor 13 is connected through a resistor 29 to emitter electrode 10 so that the operation of one of the resonant circuit means is not disturbed by the coincidental operation of the other resonant circuit means. Paired diodes 26 and 27, which may preferably be of the same type as paired diode 9, are connected respectively across series inductors 7 and 8 so as to act as nonlinear elements which serve to regulate the amplitudes of the voltages across these inductors to control gain in the same manner as diodes 87 and 84 in FIG. 1 of the above-mentioned copending Meacham et al. application.

Resonant circuit means 2 comprises an inductor 17 and a resonant capacitor 18, while resonant circuit means 3 comprises an inductor 19 and a resonant capacitor 20. Inductors 17 and 19 are each tapped at preselected inductance values to provide two groups of terminals 21 and 22. Resonant capacitors 18 and 20 are connected to the common conductor 23. Each of the terminals of each group of terminals 21 and 22 is connected to one side of a normally open switching means 24 or 25. The other side of each of the switching means 24 and 25 is connected to the common conductor 23 so as to define a normally open resonant circuit path comprising resonant capacitor 18 or 20, inductor 17 or 19 and the switching means 24 or 25 connected thereacross. Although switching means 24 and 25 are illustrated as manually operable single-pole, single-throw switches, it will be apparent that selective switching of the various resonant circuit paths may be accomplished by an automatic type of transducing arrangement, such, for example, as that described in the above-mentioned copending DiIoria et al. application. Further, each of resonant circuit means 2 and 3 is electromagnetically coupled to the positive feedback path connecting emitter electrode 10 and base electrode 6 of transistor 5. Resonant circuit means 2 is coupled to this feedback path by means of the electromagnetic couplings between inductors 17, 12 and 7. Resonant circuit means 3 is coupled to the feedback path by means of the electromagnetic couplings between inductors 19, 13 and 8.

To increase the reliability and improve the response characteristic of resonant circuit means 2 and 3, in accordance with the present invention there is further provided a unidirectionally conductive path connected across the serially connected resonant capacitor and inductor comprising each of the resonant circuit means. More specifically, resonant circuit means 2 has a unidirectionally conductive path comprising a resistor 30 and a diode rectifier 31 connected across serially connected inductor 17 and resonant capacitor 18. Resonant circuit means 3 has a unidirectionally conductive path comprising resistor 32 and diode rectifier 33 connected across serially connected inductor 19 and resonant capacitor 20.

With such an arrangement, the application of direct-current power to power leads 14, for example from a telephone line, causes a voltage drop across diode 9 which provides a relatively constant emitter bias, thereby eliminating the possibility of the transistor overloading. Since an emitter follower configuration exists and the elements of the feedback path are so designed that the amplifier has a voltage gain of 1 with a phase shift of 0, so that $\mu\beta=1$ at resonance, such application of direct-current power excites transistor oscillator 4 into oscillation, notwithstanding the fact that switching means 24 and 25 of resonant circuit means 2 and 3 are in their open conditions.

Because of the inherent capacitances of normally open resonant circuit means 2 and 3, these oscillations, prior to the closure of switching means 23 and 24, cause spurious currents to be present within each of resonant circuit means 2 and 3. The unidirectionally conductive path comprising resistor 30 and diode rectifier 31 connected across inductor 17 and resonant capacitor 18 conducts the spurious currents in one direction, thus placing upon resonant capacitor 18 a charge the magnitude of which is determined by these currents. In a like manner, current flowing in the unidirectionally conductive path comprising resistor 32 and diode rectifier 33 places a charge upon resonant capacitor 20. Accordingly, if normally open resonant circuit paths of each of resonant circuit means 2 and 3 are thereafter simultaneously closed, the charge upon each of resonant capacitors 18 and 20 shock excites its respective resonant circuit means into practically instantaneous oscillation at resonant amplitude and frequency. These oscillations are supplied to the feedback path by way of the electromagnetic couplings between inductor 17 and inductors 7 and 12, and inductor 19 and inductors 8 and 13, thus causing transistor oscillator 4 to produce a multi-frequency signal across load resistor 16 whose frequencies are dependent upon the oscillatory condition of circuit means 2 and 3, such signal being the output signal of oscillation generator 1.

It will be appreciated that the above-described arrangement is merely an illustration of the principles of the invention. Numerous other arrangements and modifications may be devised by one skilled in the art without departing from the spirit and scope of the invention.

What is claimed is:

1. An oscillation generator comprising an oscillator circuit including an amplifier having a first pair of terminals connectable to an input biasing source and a second pair of terminals connected to each other by first inductive means defining a positive feedback path therebetween, and resonant circuit means positioned in close proximity to said oscillator circuit comprising serially connected capacitive and second inductive means, the latter being electromagnetically coupled to said first inductive means, switching means connected across said serially connected capacitive and second inductive means for defining therewith a resonant tank circuit, and a unidirectional conductive path connected across said serially connected capacitive and second inductive means, whereby inherent capacitances between said oscillator circuit and said resonant circuit means induce spurious currents in the latter due to oscillations in the former upon it being connected to a biasing source, said spurious currents are conducted through said unidirectional conductive path in only one direction so as to place a charge upon said capacitive means, and the closure of said switching means substantially instaneously shock excites said tank circuit into oscillation, such excitation being reflected by said electromagnetic coupling into said oscillator circuit to substantially instantaneously determine the frequency and magnitude at which generator oscillations are sustained.

2. An oscillation generator comprising a transistor oscillator having a first pair of transistor electrodes connectable to an input biasing source and a second pair of transistor electrodes connected to each other by a first inductive means defining a positive feedback path therebetween, and resonant circuit means positioned in close proximity to said transistor oscillator comprising serially connected capacitive and second inductive means, said second inductive means being electromagnetically coupled to said first inductive means, switching means connected across said serially connected capacitive and second inductive means for defining therewith a resonant tank circuit, and a unidirectional conductive path connected across said serially connected capacitive and second inductive means, whereby inherent capacitances between said transistor oscillator and said resonant circuit means induce spurious currents in the latter due to oscillations in the former upon it being connected to a biasing source, said spurious currents are conducted through said unidirectional conductive path in only one direction so as to place a charge upon said capacitive means, and the closure of said switching means causes a discharge of said capacitive means so as to substantially instantaneously shock excite said resonant circuit means into oscillation, such excitation being reflected by said electromagnetic coupling into said transistor oscillator to substantially instantaneously determine the frequency and magnitude of the generator oscillations.

3. An oscillation generator for multi-frequency signaling systems comprising an oscillator circuit including an amplifier having a first pair of terminals connectable to an input biasing source and a second pair of terminals connected to each other by a positive feedback path including first and second serially connected inductive means, and first and second resonant circuit means each positioned in close proximity to said oscillator circuit, said first resonant circuit means comprising serially connected first capacitive and third inductive means, the latter being electromagnetically coupled to said first inductive means, first multiple switching means connected to said first capacitive means and to a plurality of taps along the length of said third inductive means for defining therewith a first plurality of resonant tank circuits, and a first unidirectional conductive path connected across said first capacitive and third inductive means, and said second resonant circuit means comprising serially connected second capacitive and fourth inductive means, the latter being electromagnetically coupled to said second inductive means, second multiple switching means connected to said second capacitive means and to a plurality of taps along the length of said fourth inductive means for defining therewith a second plurality of resonant tank circuits, and a second unidirectional conductive path connected across said second capacitive and fourth inductive means, whereby inherent capacitances between said oscillator circuit and said first and second circuit means induce spurious currents in each of said resonant circuit means due to oscillations in the oscillator circuit upon it being connected to a biasing source, said spurious currents being conducted through said unidirectional conductive paths so as to place charges upon said first and second capacitive means, and the closure of said first and second multiple switching means substantially instantaneously shock excite tank circuits of said first and second plurality of tank circuits into oscillation, such excitations being reflected by said electromagnetic couplings into said oscillator circuit to substantially instantaneously determine the frequencies and magnitudes at which generator multi-frequency signals are sustained.

4. An oscillation generator in accordance with claim 3, wherein said amplifier comprises a transistor, each of said unidirectionally conductive paths comprises serially connected resistive and rectifying elements, and each of said multiple switching means comprises a plurality of distinct switches each connected between a tap along one of said inductive means and one side of the capacitive means connected thereto.

References Cited in the file of this patent

UNITED STATES PATENTS

| | | |
|---|---|---|
| 2,555,305 | Alty | June 5, 1951 |
| 2,684,466 | Staples et al. | July 20, 1954 |
| 2,758,207 | Parzen | Aug. 7, 1956 |
| 2,841,700 | Hallden | July 1, 1958 |
| 2,853,613 | Nilssen | Sept. 23, 1958 |